United States Patent [19]

Paytas

[11] 4,305,498
[45] Dec. 15, 1981

[54] REMOVABLE CONTAINER ASSEMBLY FOR HOLDING AND DISPLAYING PHOTOGRAPHIC PICTURES AND METHOD OF MAKING SAME

[76] Inventor: Anthony R. Paytas, 27750 Roan, Warren, Mich. 48093

[21] Appl. No.: 113,855

[22] Filed: Jan. 21, 1980

[51] Int. Cl.³ .............................................. B65D 5/50
[52] U.S. Cl. ................................. 206/44 B; 206/455; 40/152.1; 40/155; 40/156
[58] Field of Search ................. 206/556, 455, 44 B, 206/360; 40/155, 156, 154, 152, 152.1, 152.2

[56] References Cited

U.S. PATENT DOCUMENTS

| | | | |
|---|---|---|---|
| 2,776,743 | 1/1957 | Treiss | 206/360 |
| 3,400,477 | 9/1968 | Brown | 40/156 |
| 3,741,386 | 6/1973 | Schmidt | 206/455 |
| 3,789,528 | 2/1974 | Knoll et al. | 40/152 |
| 3,900,980 | 8/1975 | Chambers | 40/152.1 |
| 3,996,682 | 12/1976 | Schwartz | 40/156 |
| 4,041,632 | 8/1977 | Sarkisian | 40/156 |
| 4,217,710 | 8/1980 | Becker | 40/156 |

FOREIGN PATENT DOCUMENTS

| | | | |
|---|---|---|---|
| 2653546 | 5/1977 | Fed. Rep. of Germany | 206/556 |
| 416841 | 10/1945 | Italy | 206/356 |

Primary Examiner—Joseph Man-Fu Moy

[57] ABSTRACT

A container assembly for holding and displaying photographic pictures is made from a spent film pack and velcro pads which are secured thereto so that the assembly is removable from a flat surface such as the bottom of a camera on which complementary velcro pads are similarly secured. The spent film pack includes a picture receptacle and a spring support element both of which are modified to hold a developed or developing picture from a similar film pack. The held picture is displayed through an opening formed through the receptacle which permits the viewing of the picture.

4 Claims, 6 Drawing Figures

U.S. Patent Dec. 15, 1981 Sheet 1 of 2 4,305,498
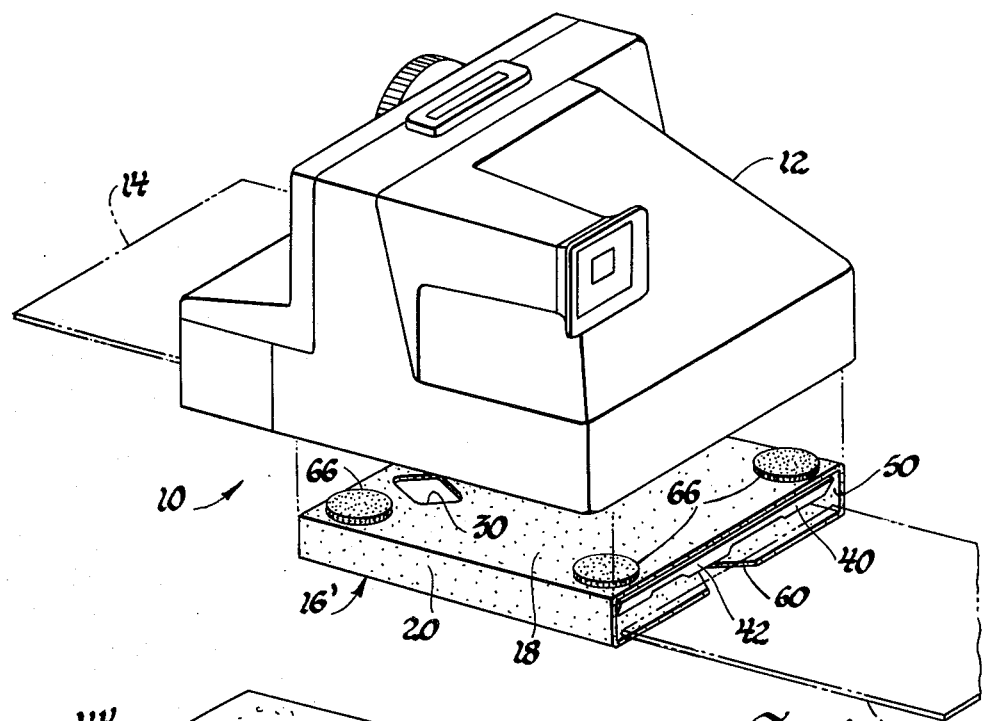
Fig. 1
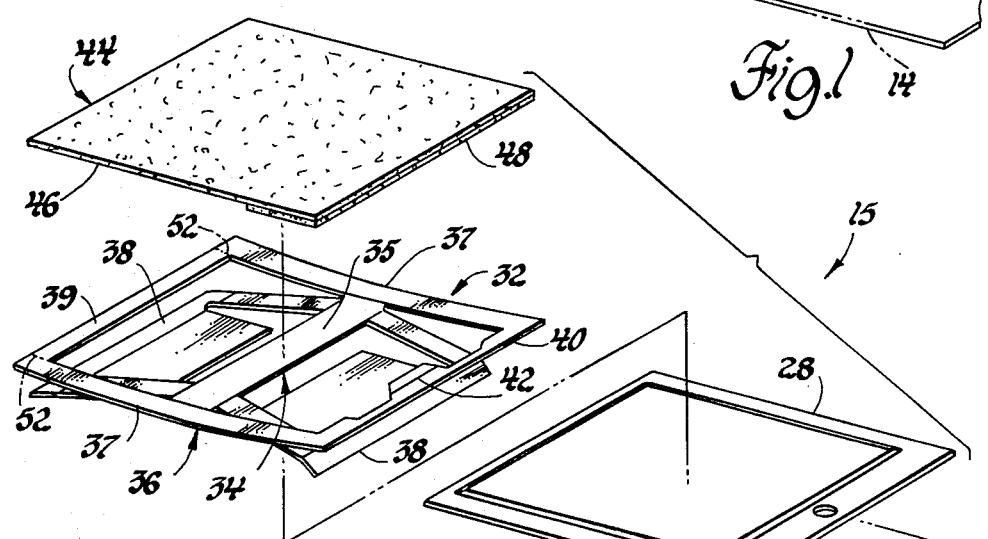
Fig. 2
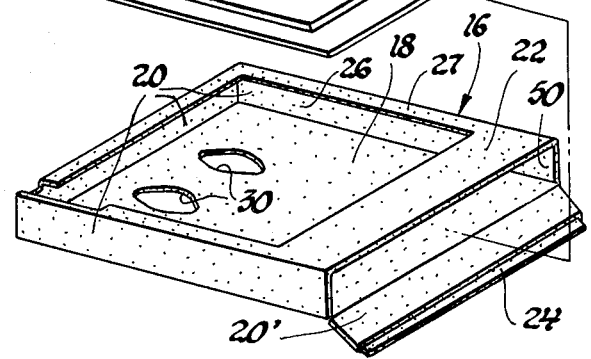

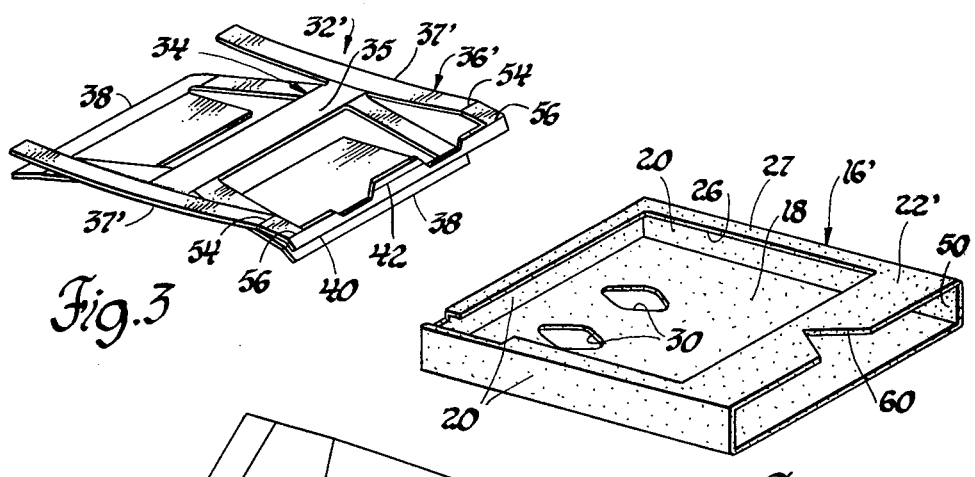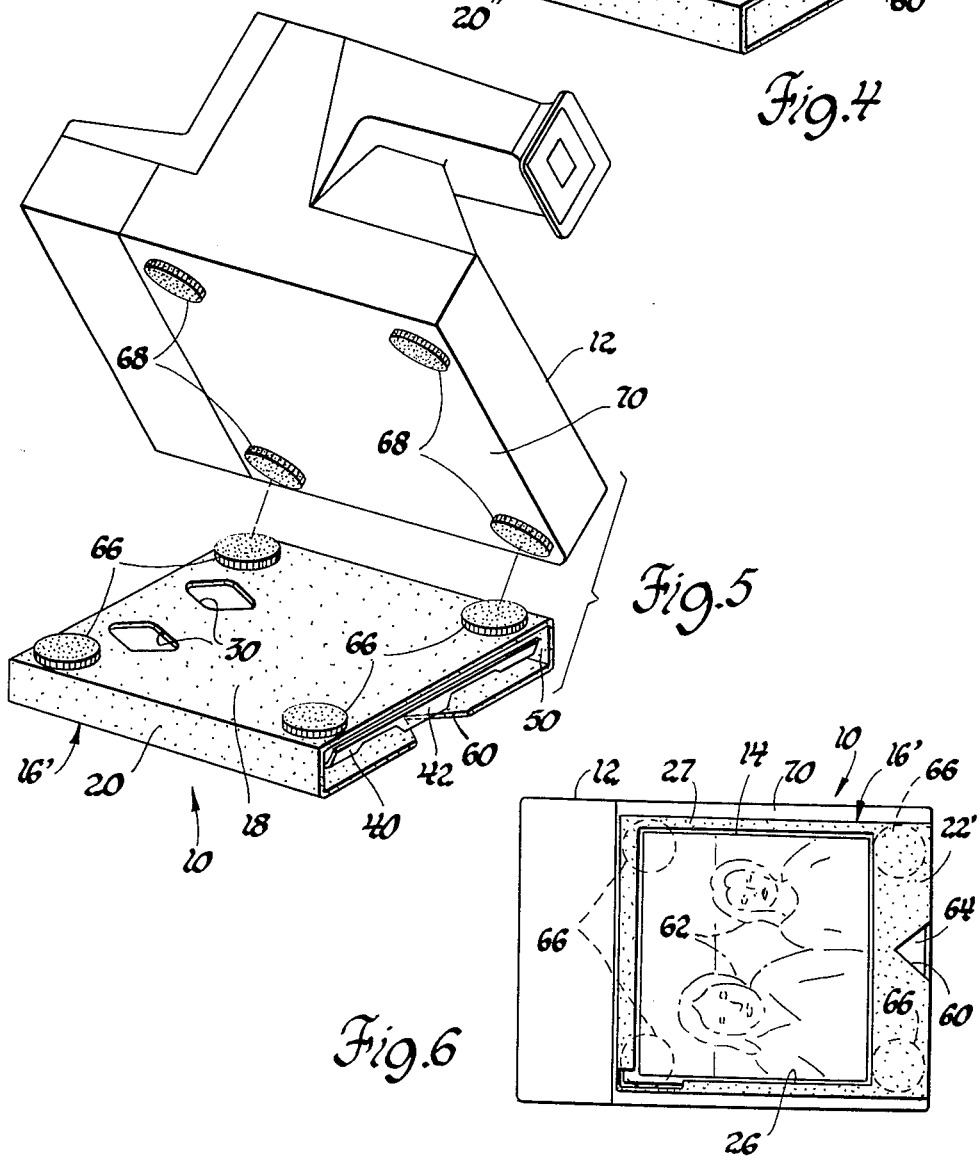

REMOVABLE CONTAINER ASSEMBLY FOR HOLDING AND DISPLAYING PHOTOGRAPHIC PICTURES AND METHOD OF MAKING SAME

TECHNICAL FIELD

This invention relates to containers for holding and displaying photographic pictures and the methods for making such containers.

BACKGROUND ART

Many cameras in private and commercial use have pictures stacked in a film pack which begin to develop themselves as they are individually ejected therefrom after exposure. The pictures are able to develop themselves due to the chemicals contained therewithin each picture. Ordinarily, the developing picture is then removed from the camera and may be laid down on a surface, held in hand or placed in a pocket. Such developing pictures must be kept away from the direct sunlight as well as hot or cold surfaces in order that the picture correctly develops. Developing and developed pictures of this type must be protected in order that the picture is neither cut, bent or folded, which might cause the developing chemicals in the form of a caustic paste to appear. This caustic paste can damage the picture, cloting, etc. with which it comes in contact.

After all the pictures have been taken and ejected by the camera from the film pack contained within the camera, the spent film pack is, ordinarily, merely thrown away—frequently in an environmentally unsafe manner.

DISCLOSURE OF THE INVENTION

An object of the present invention is to provide an improved container assembly for holding and displaying at least one photographic picture, the assembly including an open-ended picture receptacle which defines a picture receiving area, a spring support element disposed within the picture receiving area to retain the held picture therein and mounting means for removably mounting the receptacle to a mounting surface for display purposes.

Another object of the invention is to provide a method of converting a conventional spent film pack into a container assembly adapted to hold and display at least one photographic picture and which is also adapted to be removably mounted to a mounting surface such as the bottom surface of a camera.

In carrying out the above objects and other objects of this invention, the preferred embodiment of the invention includes an open-ended picture receptacle including bottom, side and top walls integrally formed together to define a picture receiving area and a passageway located at the open end of the receptacle for receiving and removing pictures therethrough. Also included is a spring support element disposed within the picture receiving area for holding a picture disposed within the picture receiving area against the top wall. The support element includes a peripheral support member for supporting a picture at its border and a central spring member disposed between the support member and the bottom wall to bias the support member towards the top wall of the receptacle. The spring support element prevents a picture positioned within the picture receiving area from inadvertently falling out of the open end of the receptacle. Also included is mounting means operatively associated with the receptacle for mounting the receptacle on a mounting surface. The top wall includes a picture frame portion having an opening extending therethrough to permit the viewing of the images on the entire sensitized surface of the held picture therethrough. The border of the picture is held against the frame portion of the top wall. The top wall has a notch formed in its edge at the open end of the receptacle so that a portion of the border may be gripped to remove the displayed picture from the receptacle.

In further carrying out the above objects and other objects of this invention, a preferred method of the invention includes the steps of removing one of the side walls of a spent film pack receptacle so that the receptacle has one open end and removing a battery pack and a spring support element of the spent film pack through the open end of the receptacle. The method further includes the steps of bending the end portion of a support member of the spring support element downwardly and towards a spring member of the spring support element and inserting the spring support element into the receptacle so that the bent end portion of the support member is located adjacent the open end of the receptacle and also so that the entire exposed portion of an inserted exposed picture from a similar receptacle is visible through a film exposure opening of the receptacle and an unexposed portion of the picture is forced against the top wall of the receptacle by the biased support member. The method also includes the step of securing a part of a removable fastener on the outer surface of a bottom wall of the receptacle.

The objects, features and advantages of the present invention are apparent from the following detailed description of the best mode taken in connection with the accompanying drawings.

BRIEF DESCRIPTION OF THE DRAWINGS

FIG. 1 is an exploded perspective view of a container assembly constructed according to the present invention and a camera for use therewith;

FIG. 2 is an exploded perspective view of a spent film pack;

FIG. 3 is a perspective view of a part of the spent film pack modified in accordance with the present invention;

FIG. 4 is a perspective view of another part of the spent film pack modified in accordance with the present invention;

FIG. 5 is an exploded perspective view showing the connection between the camera and the reassembled, modified film pack; and FIG. 6 is a bottom view of the modified film pack attached to the camera.

BEST MODE FOR CARRYING OUT THE INVENTION

Referring to FIG. 1, a container assembly constructed according to the present invention from a spent film pack is indicated collectively by reference numeral 10. The assembly 10 is adapted to be removably mounted on a flat surface such as the bottom planar surface of a camera 12. The assembly 10 receives developing and/or developed pictures indicated in phantom at 14 which are ejected from a similar film pack contained within the camera 12 at the front of the camera 12. A commercially available camera particularly suited for use with the present invention is sold under the trademarks, Polaroid Land and SX-70. A suitable film pack or unit which contains a number of separate photographic films packed so as to be inserted together and which is adapted for use with this camera is sold under the trademarks, Polaroid and SX-70.

Referring now to FIG. 2 there is shown a spent or empty film pack, generally indicated at 15, which has been removed from the camera 12 and wherein all of the exposed pictures have been removed therefrom. The film pack 15 includes an integrally molded plastic receptacle 16 including bottom, side and top walls 18, 20, 20' and 22, respectively. The side wall 20' as shown in FIG. 2 is shown broken away from the two adjacent side walls 20 but still attached to the bottom wall 18 to remove the contents of the receptacle 16. The side wall 20' includes a flexible plastic sheet 24 which overlies the opening formed when the side wall 20' is attached to the adjacent side walls 20. The exposed pictures exit the receptacle 16 through the opening covered by the plastic sheet during operation of the camera 12. The pictures 14 are exposed through an opening 26 defined by a film frame portion 27 of the top wall 22 and, thereafter, are mechanically moved by the camera 12 through the opening covered by the sheet 24.

The spent film pack 15 also includes a thin package battery assembly 28 which powers the camera 12 for pictures made from the spent film pack 15. The battery assembly 28 lies flat within the plastic receptacle 16 and overlies a pair of spaced battery openings 30 formed through the bottom wall 18 so that contact engaging parts (not shown) of the camera 12 can tap the power of the battery assembly 28 to energize the camera 12.

The spent film pack 15 also includes a metal, flat plate spring element or spring support element generally indicated at 32. The spring support element 32 includes a bottom central spring member 34 integrally formed with an upper peripheral support member generally indicated at 36. The spring member 34 includes a central connector portion 35 which is integrally connected to and supports the support member 36 at its opposite ends. The spring member 34 includes legs 38 integrally connected together by the central connector portion 35 at its ends thereof. The legs 38 flex or deform at the top surface of the battery assembly 28 in order to permit the support member 36 to hold a stack of unexposed pictures within the receptacle 16. The topmost picture on the stack is held against the top wall 22 of the receptacle 16 to allow the sensitized surface thereof to be exposed through the opening 26.

The support element 36 includes a pair of parallel, spaced side support rails 37 and a pair of interconnecting, parallel, spaced end support rails 39 and 40 integrally formed therewith. The end support rail 40 includes an inwardly extending bent projection 42 integrally formed therewith.

The spent battery pack 15 further includes a sheet assembly generally indicated at 44, which includes a paper sheet 46 which is adhesively attached to the central connector portion 35 of the spring member 34. The assembly 44 also includes a thin sponge layer 48 which provides a cushion for the sheet assembly 44. The stack of pictures rests upon the top surface of the paper sheet 46 such that when the film pack 15 has no pictures remaining therein the paper layer 46 can be seen through the opening 26.

The spent film pack 15 is converted to the container assembly 10 which is adapted for holding and displaying at least one photographic picture through a number of steps illustrated by FIGS. 2 through 5. Initially, the side wall 20' is broken away from the adjacent side walls 20 and the bottom wall 18. The battery assembly 28 and the spring support element 32 with the attached sheet assembly 44 are removed from the resulting open end 50 of the receptacle 16. The battery assembly 28 is discarded as well as the sheet assembly 48 after it has been removed from the connector portion 35. Then, as shown in FIGS. 2 and 3, the end support rail 39 is removed from the support member 36 such as by cutting along phantom lines 52 as shown in FIG. 2. The side support rails 37 are then bent along lines 54 and 56 to form the modified support rails 37' of a modified support member 36'. As shown in FIG. 3, the bending causes the projection 42 to extend upwardly.

The support element 36 resembles a cradle wherein the side support rails 37 extend upwardly from the connector portion 35. The side support rails 37' are bent to allow a picture to be easily inserted and held within the receptacle 16' after the spring support element 32' is inserted within the receptacle 16'.

As shown in FIG. 4, the top wall 22 of the receptacle 16 is modified by cutting a notch 60 therein to form a modified top wall 22' of the modified receptacle 16'.

As shown in FIG. 6, when the modified spring support element 32' is inserted through the open end 50 of the modified receptacle 16' and the picture 14 is inserted between the spring support element 32' and the top wall 22', images 62 formed on the picture 14 are visible through the opening 26 and the border 64 of the picture 14 is held against the top wall 22' about the opening 26 by the support rails 37' and the bent projection 42. The notch 60 allows one to remove the picture 14 from the picture receiving area defined by the walls 18, 20 and 22' of the modified receptacle 16'.

Velcro pads 66 are mounted on the bottom surface of the bottom wall 18 at the corners thereof so that the assembly 10 may be releasably secured to a flat surface having complementary velcro pads spaced in the same fashion thereon. Preferably the complementary velcro pads 68 are positioned on the bottom surface 70 of the camera 12 in order to releasably engage the velcro pads 66. In the preferred embodiment of the assembly 10, the velcro pads 66 comprise coarse plasticore nylon hooks while the velcro pads 68 comprise relatively soft velcro pads which act as protective feet for the camera 12 when the assembly 10 is not mounted to the bottom surface 70 of the camera 12.

While a preferred embodiment of the container assembly and the method of making the container assembly has been shown and described herein in detail, those skilled in this art will recognize various alternative designs and embodiments for practicing the present invention as defined by the following claims.

What is claimed is:

1. A container assembly for holding and displaying at least one photographic picture having a predetermined length and width, the picture having images formed on a sensitized surface thereof and an enclosing border formed about the sensitized surface, the container assembly being adapted to be removably mounted to a mounting surface adapted to receive the assembly, the assembly comprising:

an open-ended picture receptacle including bottom, side and top walls integrally formed together to define a picture receiving area and a passageway located at the open end of the receptacle for receiving and removing pictures therethrough;

a spring support element disposed within said picture receiving area for holding a picture disposed within the picture receiving area against the top wall, the spring support element including a peripheral support member for supporting a picture at its border and a central spring member disposed between the support member and the bottom wall to bias the support member towards the top wall of the receptacle, the spring support element preventing a picture positioned within the picture receiving area from inadvertently falling out of the open end of the receptacle; and mounting means operatively associated with the receptacle for mounting the receptacle on the mounting surface; the top wall including a picture frame portion having an opening extending therethrough to permit the viewing of the images on the entire sensitized surface of a held picture therethrough, the border of the picture being held against the frame portion of the top wall, the top wall having a notch formed in its edge at the open end of the receptacle so that a portion of the border may be gripped to remove the displayed picture from the receptacle.

2. The assembly as claimed in claim 1 wherein said mounting means comprises at least two complementary velcro pads one of said pads being attached on the bottom surface of the bottom wall, the second velcro pad being adapted to be secured to the mounting surface to allow the assembly to be removably mounted thereon.

3. The assembly as claimed in claim 1 wherein said support member has a bent portion located adjacent the top wall and the open end of the receptacle and bent towards the spring member to guide an inserted picture into the picture receiving area and positioned on the top surface of the support member so that the images on the entire sensitized area can be seen through the opening, the spring member deforming to permit the insertion of the picture, the bent portion of the support member holding a portion of the border against the top wall adjacent the passageway to prevent the picture from falling out of the receptacle.

4. The assembly as claimed in claim 3 wherein the bent portion of the support member includes an upwardly extending projection to force the portion of the border against the top wall adjacent the notch.

* * * * *